US006964388B1

(12) United States Patent
Ritter

(10) Patent No.: US 6,964,388 B1
(45) Date of Patent: Nov. 15, 2005

(54) FISHING REEL

(76) Inventor: Roger Ritter, Glaernisch-Str. 10A, 8132 Egg b. Zurich (CH)

( * ) Notice: Subject to any disclaimer, the term of this patent is extended or adjusted under 35 U.S.C. 154(b) by 0 days.

(21) Appl. No.: 10/818,320

(22) Filed: Apr. 5, 2004

Related U.S. Application Data

(60) Provisional application No. 60/460,869, filed on Apr. 7, 2003.

(51) Int. Cl.[7] .................. A01K 89/02; B65H 23/06
(52) U.S. Cl. .................. 242/291; 242/318; 242/290; 242/292; 242/294; 242/304; 242/396.7; 188/71.1
(58) Field of Search .............. 242/290, 291, 242/292, 293, 294, 302, 303, 304, 317, 318, 242/322, 381.6, 396.6, 396.7, 396.8; 188/71.1, 188/1.12

(56) References Cited

U.S. PATENT DOCUMENTS

| 521,245 | A | * | 6/1894 | Partridge | 242/396.7 |
|---|---|---|---|---|---|
| 560,925 | A | * | 5/1896 | Pflueger | 242/396.7 |
| 2,505,151 | A | * | 4/1950 | Schweitz | 242/395 |
| 3,467,336 | A | * | 9/1969 | Appleton | 242/291 |
| 4,111,387 | A | * | 9/1978 | Leary | 244/155 A |
| 4,129,273 | A | * | 12/1978 | Hill | 244/155 A |
| 4,461,438 | A | * | 7/1984 | Pook et al. | 244/153 R |
| 4,493,461 | A | * | 1/1985 | Polanco et al. | 242/396.7 |
| 6,095,311 | A | | 8/2000 | Henschel | 192/223.3 |
| 6,732,965 | B2 | * | 5/2004 | Bascue, Jr. | 242/304 |
| 2004/0173705 | A1 | * | 9/2004 | Hill et al. | 242/317 |

* cited by examiner

Primary Examiner—Kathy Matecki
Assistant Examiner—Evan Langdon
(74) Attorney, Agent, or Firm—Adel A. Ahmed

(57) ABSTRACT

A fishing reel includes a spool disk, a handle disk mounted coaxially and in juxtaposition with the spool disk, a winding handle or crank affixed to the handle disk, and a brake mechanism, including an actuator incorporated in the handle, for applying a drag braking torque between the spool disk and the handle disk. The braking torque is controllable by a user by squeezing the handle while holding the handle for cranking. Accordingly, the user does not have to let go of the winding handle in order to apply or vary the drag.

30 Claims, 14 Drawing Sheets

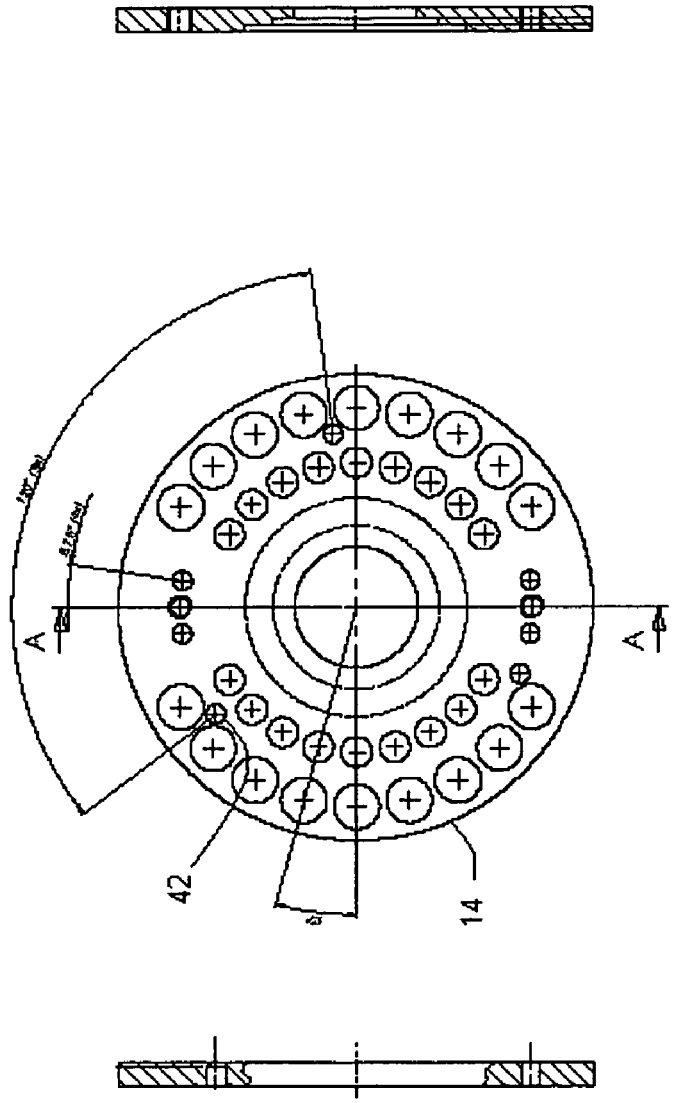

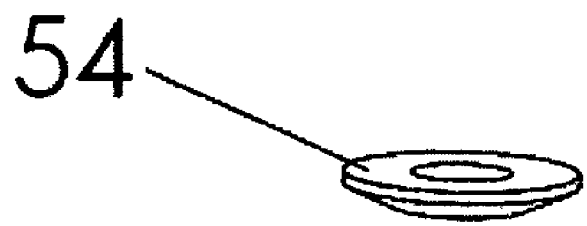
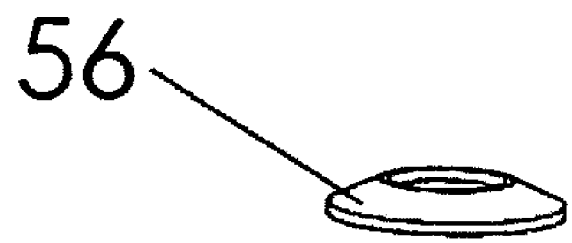
FIG. 12

FISHING REEL

CROSS-REFERENCE TO RELATED APPLICATIONS

Specific reference is hereby made to U.S. Provisional Patent Application No. 60/460,869, filed in the United States Patent and Trademark Office on Apr. 7, 2003 in the name of Roger Ritter, the inventor in the present application, and entitled FISHING REEL, and whereof the benefit of priority is hereby claimed and whereof the disclosure is hereby incorporated herein by reference.

The present invention relates to fly reels for fishing and, more specifically, to fly reels of the kind having a rotatable line spool equipped with a brake or drag mechanism.

BACKGROUND OF THE INVENTION

Brakes of the kind such as may be used in conjunction with fly reels for fishing typically utilize a preset adjustment to predetermine the braking or drag force before a fish is hooked on the line.

In the sense used herein, a leader/tippet is a "see-through" or transparent or translucent portion of fishing line that is also coupled between the standard fly-fishing line and the lure, typically an artificial fly. Such a line, or leader/tippet, is typically relatively fine and is usually the weakest link in the system, exhibiting the lowest ultimate tensile strength in the fishing line. Generally, when a hooked fish is lost, it is because the tippet has broken.

SUMMARY OF THE INVENTION

In prior art fishing reels, the drag is typically preset before hooking a fish. Presetting is typically by way of a knob. It is herein recognized that the preset drag may be too little when the fish makes a long run, pulling out too much line, and the user loses control of the fish and runs out of line and finally the leader/tippet breaks. In such situations, it is usual for the user of such a reel to increase drag force by palming the spool rim or reaching around the reel for the adjusting knob. Adjusting the main drag during active operations is awkward and often not precise.

On the other hand, presetting the drag to a level that is too heavy typically causes the leader/tippet to break immediately after the fish is hooked.

Accordingly, it is virtually not possible in practice to preset the drag force ideally in advance, because the ideal drag force also depends on the size of fish caught.

It is herein recognized that it is desirable for a fishing reel user, typically a fisherman, to be able to adjust the drag quickly and conveniently, in accordance with the needs of a particular situation. It is also herein recognized that the procedure for adjusting the drag should be convenient and practical for the user and preferably should cause little interference with other functions in the user's manipulation of the fishing reel as may be required for operations incident to fishing. It is also herein recognized that it is desirable that a user should be able to maintain hold of the reel handle when a fish is on the line, without having to let go to perform brake adjustments. It is an object of the present invention to provide a convenient and effective means for controlling and adjusting the drag force.

In accordance with an aspect of the present invention, fishing apparatus includes an integrated drag force adjusting mechanism inside the crank handle giving a user the possibility to apply the ideal drag force by squeezing the crank handle.

In accordance with another aspect of the invention, a fishing reel comprises a crank handle for winding the reel and a drag force adjusting mechanism integrated into the crank handle, the mechanism being responsive to the crank handle being squeezed for applying a user-selectable drag force.

In accordance with another aspect of the invention, a fishing reel comprises a crank handle for cranking the reel and a drag force adjusting mechanism in the crank handle, the mechanism being responsive to the crank handle being squeezed with a given pressure for controlling the drag force to a value determined by the given pressure.

In accordance with another aspect of the invention, a fishing reel comprises a dual-purpose crank handle for cranking the reel, the crank handle comprising a drag force adjusting mechanism, the mechanism being responsive to the crank handle being squeezed with a given pressure for controlling the drag force to a value determined by the given pressure.

In accordance with an aspect of the present invention, a fishing reel includes a brake mechanism wherein braking torque is controllable by pressure on a handle which is also usable for cranking the reel.

In accordance with another aspect of the present invention, a fishing reel includes a spool disk and a handle disk mounted coaxially therewith; and a brake mechanism for applying a braking torque between the spool disk and the handle disk, wherein at least a portion of the braking torque is controllable by a user by applying pressure or releasing pressure on a handle which is also used for cranking the handle disk.

In accordance with another aspect of the invention, a fishing reel comprises a spool, including a spool disk; a handle disk mounted coaxially with the spool disk in juxtaposition thereto; a handle affixed to the handle disk; and a brake mechanism, including an actuator incorporated in the handle, for applying a braking torque between the spool disk and the handle disk, the braking torque being controllable by a user by squeezing the handle while holding the handle for cranking.

In accordance with another aspect of the invention, a fishing reel comprises a spool for winding a fishing line; a handle disk having a winding handle thereon; a brake for applying a drag braking force between the spool and the handle disk; the handle comprising a brake button system for applying the brake.

In accordance with another aspect of the invention the brake button system is responsive to finger pressure for application of the brake in approximate proportion to the force of the finger pressure.

In accordance with another aspect of the invention the brake button system comprises at least a first brake button and a cam apparatus coupled to the first brake button and further coupled to the brake.

In accordance with another aspect of the invention, the brake comprises a brake pad for bearing against a surface portion of the spool for applying a friction braking force thereto; the cam apparatus comprises a conical or tapered washer coupled between the brake button and the brake pad such that finger pressure applied to the brake button causes the washer to exert a force against the pad so as to increase the friction braking force.

In accordance with another aspect of the invention, the brake button system comprises first and second brake buttons; the brake comprises first and second brake pads for bearing against the surface portion of the spool for applying a friction braking force thereto; the cam apparatus comprises a conical or tapered washer coupled between (a) the first and second brake buttons and (b) the first and second brake pads, such that finger pressure applied to the first and second brake buttons tending to squeeze them together causes the conical washer to exert a force against the pads so as to increase the friction braking force.

In accordance with another aspect of the invention, a fishing reel comprises a spool for winding a fishing line, including a spool disk; a handle disk having a winding handle thereon; a brake for applying a drag braking force between the spool and the handle disk; the handle comprising a pressure sensitive brake actuating mechanism responsive to finger pressure on the handle for actuating the brake.

In accordance with another aspect of the invention, the winding handle comprises a button mechanism and at least one captive brake pad arranged such that, when a user squeezes the handle, the button mechanism acts to cause application of the brake by urging the at least one captive brake pad into contact with the spool disk, thereby generating a frictional torque between the spool disk and the handle disk.

In accordance with another aspect of the invention, the button mechanism operates by applying an inclined surface to produce a force on the at least one captive brake pad.

In accordance with another aspect of the invention, the button comprises two halves of a hollow cylindrical body arranged such that when the two halves are pressed together by a user, a tapered washer at each end of the two halves operates as an inclined surface to tend to slide out axially and exert a force against a constraint on one side, and to exert a force against the at least one captive brake pad, respectively.

In accordance with another aspect of the invention, the button comprises two halves of a hollow cylindrical body arranged such that when the two halves are pressed together by a user, a tapered washer at each end of the two halves operates as an inclined surface to tend to slide out axially and exert a force against a constraint of the winding handle on one side, and to exert a force against the at least one captive brake pad on the other side, respectively.

In accordance with another aspect of the invention, a fishing reel comprises a spool for winding a fishing line; a handle disk having a winding handle thereon; a brake for applying a drag braking force between the spool and the handle disk; the winding handle including an actuating mechanism for the brake, the mechanism being adapted to respond to finger pressure of a user's fingers squeezing the winding handle while holding the winding handle normally for winding the reel so as to apply the brake as a function of the finger pressure so that the user's fingers do not have to leave the winding handle to operate the brake.

In accordance with another aspect of the invention, a fishing reel comprises a spool, including a spool disk; a handle disk mounted concentrically juxtaposed to the spool disk; a brake mounted on the handle disk for applying a braking force between the spool disk and the handle disk; a dual purpose reel handle mounted on the spool disk, the reel handle comprising a finger grip portion adapted for being grasped by a user's fingers for winding the reel; and the reel handle comprising a brake actuator coupled between the finger grip portion and the brake, such that squeezing the finger grip portion by the user's fingers causes the actuator to apply the brake in accordance with the pressure.

In accordance with another aspect of the invention, a fishing reel comprises a spool adapted for rotatably mounting on an axle and coupled to a spool disk for rotation therewith; a handle disk rotatably mounted concentrically with and in juxtaposition to the spool disk; a drag brake pad arrangement mounted on the handle disk and bearing against the spool disk with a controllable braking force for providing braking between the spool disk and the handle disk; a handle, comprising a generally cylindrical hollow handle housing rotatably mounted on the handle, the handle housing exhibiting an opening in a cylindrical wall thereof; and a brake actuating mechanism disposed in the handle housing and being coupled to the drag brake pad arrangement for controlling the braking force, the mechanism comprising a brake button accessible to a user's fingers through the opening while gripping the handle for cranking the handle disk.

In accordance with another aspect of the invention, the mechanism comprises: a cam element, exhibiting an inclined surface and an end surface, the cam element being disposed in the housing such that pressing the brake button causes the brake button to press against the inclined surface thereby causing the end surface to push against the drag brake pad.

In accordance with another aspect of the invention, a fishing reel comprises a housing, including an axle; a spool, including a spool disk, rotatably mounted on the axle; a handle disk rotatably mounted concentrically with and in juxtaposition to the spool disk; first and second drag brake pads mounted on the handle disk and bearing against the spool disk with a controllable braking force for providing braking between the spool disk and the handle disk; a generally cylindrical hollow handle housing rotatably mounted on the handle disk and adapted for gripping by a user's fingers for cranking the handle disk, the handle housing exhibiting first and second diametrically opposed openings in a cylindrical wall thereof; and a brake actuating mechanism disposed in the handle housing and being coupled to the drag brake pads for controlling the braking force, the mechanism comprising first and second brake buttons accessible through the first and second openings, respectively, to a user's fingers while gripping the handle for cranking the handle disk.

In accordance with another aspect of the invention, the brake actuating mechanism comprises first and second brake buttons accessible for being squeezed together through the first and second openings, respectively, by the user's fingers; and a cam element, exhibiting an inclined surface and an end surface, disposed in the housing such that squeezing together the first and second brake button causes the brake buttons to press against the inclined surface thereby causing the end surface to push against the drag brake pads.

In accordance with another aspect of the invention, the brake actuating mechanism comprises first and second brake buttons accessible for being squeezed together through the first and second openings, respectively, by the user's fingers; and a tapered washer having a an inclined surface and a flat surface disposed in the housing between the brake buttons and the drag brake pads such that squeezing together the first and second brake button causes the brake buttons to press against the inclined surface thereby urging the flat surface to move in a direction towards the drag brake pads; and a resilient or elastic element interposed between the flat surface and the drag brake pads such that gradually squeezing together the first and second brake button causes the brake buttons to apply a progressively increasing braking force.

In accordance with another aspect of the invention, a fishing reel comprises a further tapered washer having an inclined surface and a flat surface disposed in the housing such that squeezing together the first and second brake button causes the brake buttons to press against the inclined surface of the further tapered washer thereby urging the flat surface to move in a direction away from the drag brake pads; and an axle passing through bearings in the generally cylindrical hollow handle housing, the axle having one end thereof affixed to the handle disk and the other end thereof forming an endstop for the handle housing and thereby preventing movement of the flat surface of the further tapered washer.

In accordance with another aspect of the invention, a fishing reel comprises a resilient or elastic element interposed between the flat surface of the further tapered washer and the endstop.

In accordance with another aspect of the invention, a fishing reel comprises an adjustable brake mounted on the handle disk for providing a base level drag between the spool disk and the handle disk.

In accordance with another aspect of the invention, a fishing reel comprises an adjustable brake mounted on the housing for providing a standard drag level drag between the spool disk and the handle disk.

In accordance with another aspect of the invention, a fishing reel comprises a reel housing; a main axle affixed to a wall of the reel housing; a spool having a flange and having a hollow shaft rotatably mounted concentrically on the main axle; a spool disk rotatably mounted concentrically on the main axle and coupled to the hollow shaft for rotation therewith; a handle disk having thereon a handle, the handle comprising a handle housing or cage; a catch unit affixed to the spool disk, the catch unit having a latching mechanism to maintain a home position on the main axle and having a bearing portion for retaining the handle disk in coaxial and freely rotatable relationship to the spool disk; a brake system mounted on the handle reel for providing a controllable drag braking force acting between the spool disk and the handle disk for resisting relative motion between the two to the extent of the braking force provided by the brake system comprising first and second friction pads located in respective holes in the handle disk and bearing upon a surface of the spool disk; and a brake control system being situated in the handle and comprising: an axle screw passing through bearings in the handle housing and being affixed to the handle disk, the screw exhibiting a screw head for acting as a stop against the housing moving away from the handle disk; first and second brake buttons arranged on opposite sides of the axle screw and being accessible for user finger pressure through respective diametrically opposed first and second openings in the handle housing, first and second conical washers slidably mounted concentrically on the axle screw and so oriented that squeezing the brake buttons together causes the brake buttons to press against the conical washers in "inclined plane" fashion and so tending to urge greater separation between the washers, wherein movement of the second conical washer is constrained by the handle housing, and a spacer arrangement interposed between (a) the first conical washer and (b) the first and second friction pads for transferring force between the first conical washer and the friction pads.

In accordance with another aspect of the invention the spacer comprises a resilient foam washer such that gradually squeezing together the first and second brake button causes the brake buttons to apply a gradually increasing braking force.

In accordance with another aspect of the invention the brake pads are made of a synthetic material.

In accordance with another aspect of the invention, the brake pads bear upon a groove formed in the surface of the spool disk.

In accordance with another aspect of the invention, a fishing reel comprises an adjustable brake mounted on the handle disk for providing a base level drag between the spool disk and the handle disk.

In accordance with another aspect of the invention, a fishing reel comprises an adjustable brake mounted on the housing for providing a standard drag level drag between the spool disk and the handle disk.

In accordance with another aspect of the invention, a fishing reel comprises a spool disk; a handle disk; a handle mounted on the handle disk; and apparatus for controlling a braking force between the spool disk and the handle disk, comprising: apparatus for providing the braking force; apparatus for deriving a brake actuation force from finger pressure applied to the handle; and apparatus for applying the brake actuation force to the apparatus for providing a braking force.

In accordance with another aspect of the invention, a method for controlling a braking force for a fishing reel spool comprises providing a brake between the spool and a handle disk; deriving a brake actuation force from finger pressure applied to a winding handle mounted on a handle disk; and applying the brake actuation force to the brake.

In accordance with another aspect of the invention, a fishing reel comprises a spool disk, a handle disk mounted coaxially and in juxtaposition with the spool disk, a winding handle or crank affixed to the handle disk, and a brake mechanism, including an actuator incorporated in the handle, for applying a drag braking torque between the spool disk and the handle disk. The braking torque is controllable by a user by squeezing the handle while holding the handle for cranking. Accordingly, the user does not have to let go of the winding handle in order to apply or vary the drag.

BRIEF DESCRIPTION OF THE SEVERAL VIEWS OF THE DRAWINGS

The invention will be more fully understood from the detailed description which follows, in conjunction with the Drawing, in which the figures are not necessarily to scale, and in which the same reference numerals designate the same parts. In the figures.

FIG. 4B shows a schematic plan and FIGS. 4A and 4C show respective side elevations of a spool disk in accordance with an embodiment of the present invention;

FIGS. 8 through 12 show a view of reel parts including a winding handle and a brake actuating mechanism in accordance with an embodiment of the present invention;

DETAILED DESCRIPTION OF THE INVENTION

The invention is herein described by way of exemplary embodiments. These are merely examples and are not intended to be taken as limiting the invention.

Figure 1:
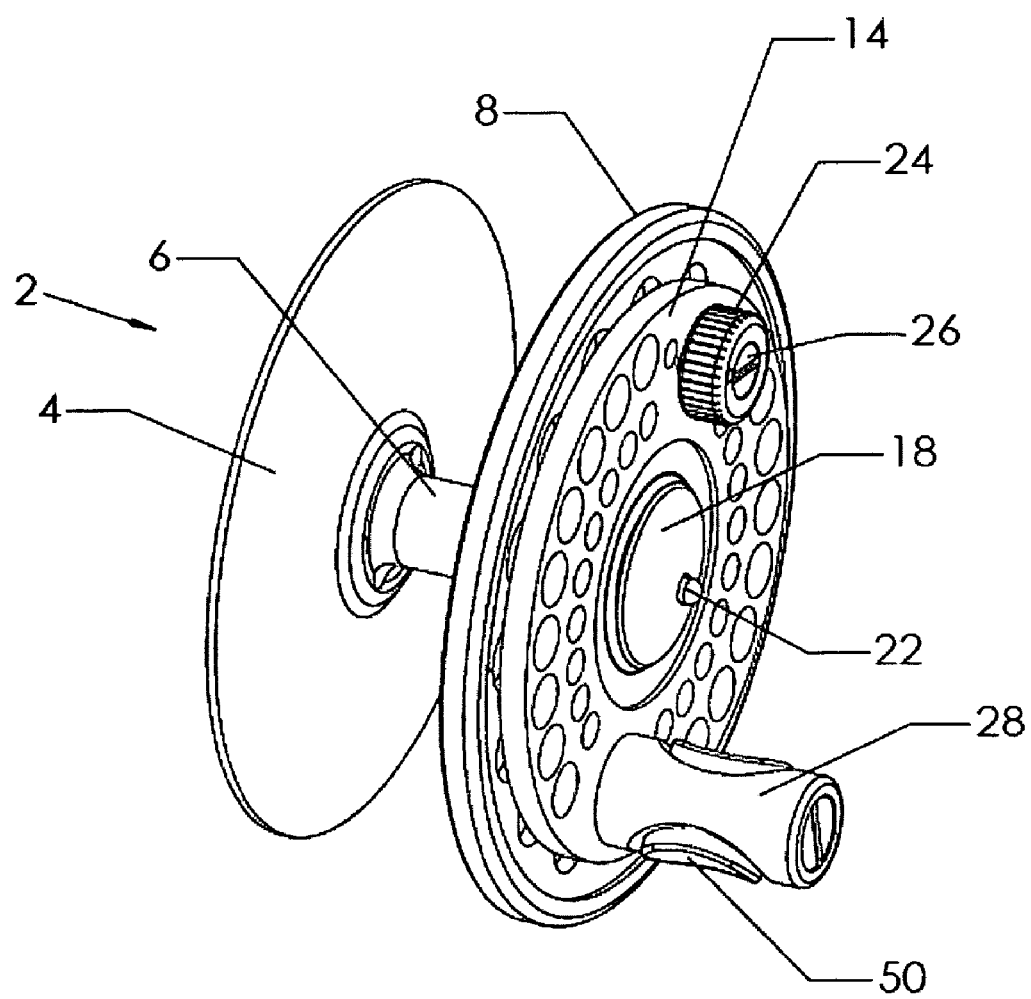
FIG. 1 shows a view of reel parts in accordance with an embodiment of the present invention.
Figure 2:
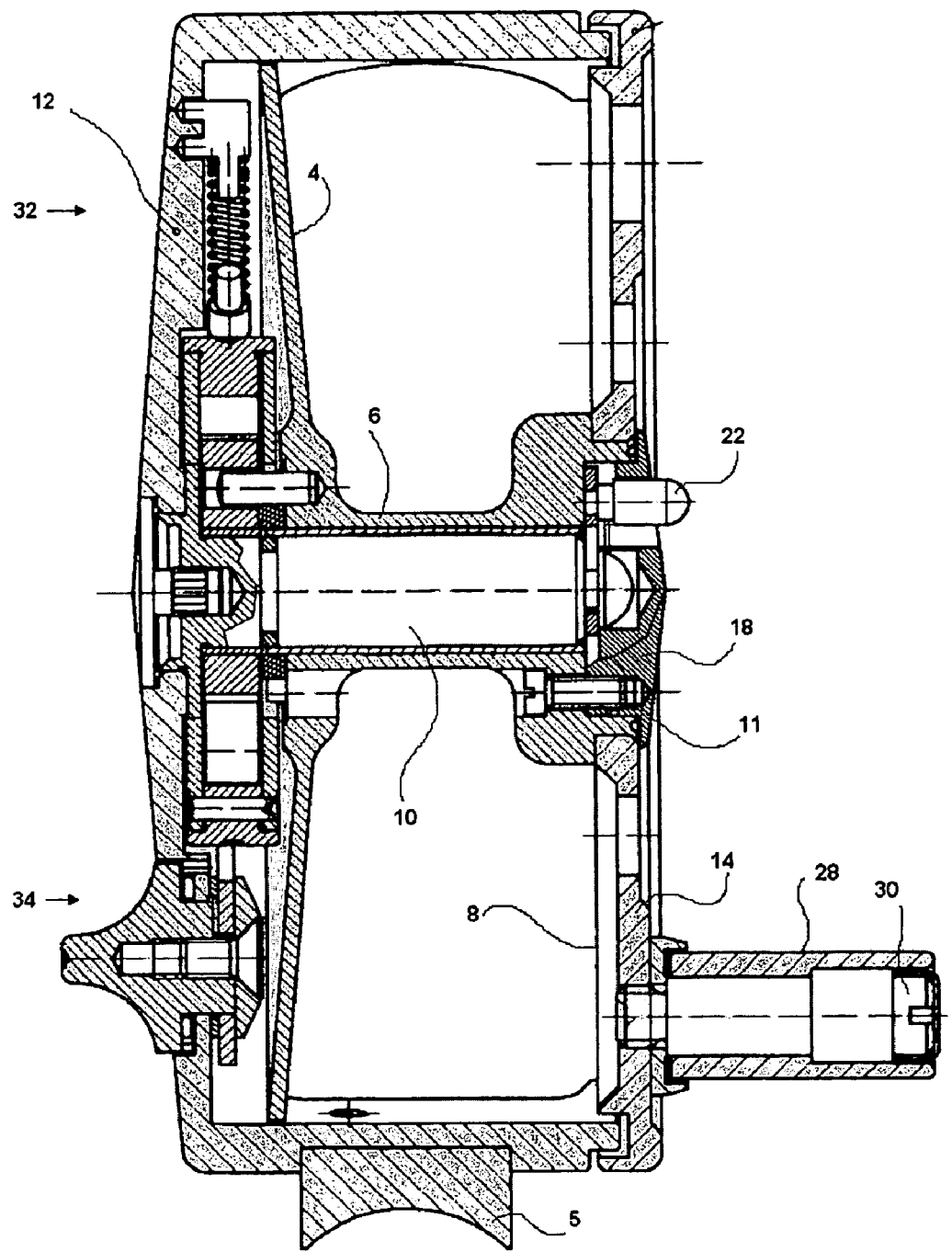
FIG. 2 shows a schematic cross-sectional view of reel parts in accordance with an embodiment of the present invention.

FIG. 1 shows parts of a reel in accordance with an embodiment of the invention. Reference is also made to FIG. 2 for a cross-sectional view of an embodiment of a reel in accordance with the present invention. Some conventional well-known parts such as the "cage", also known as a spool carrier or supporting enclosure, and an optional "saddle" for mounting the reel assembly to a fishing rod in a conventional manner, are omitted from the drawing of FIG. 1 for clarity. The term cage is used herein interchangeably with carrier, housing, enclosure, and the like.

Figure 3:
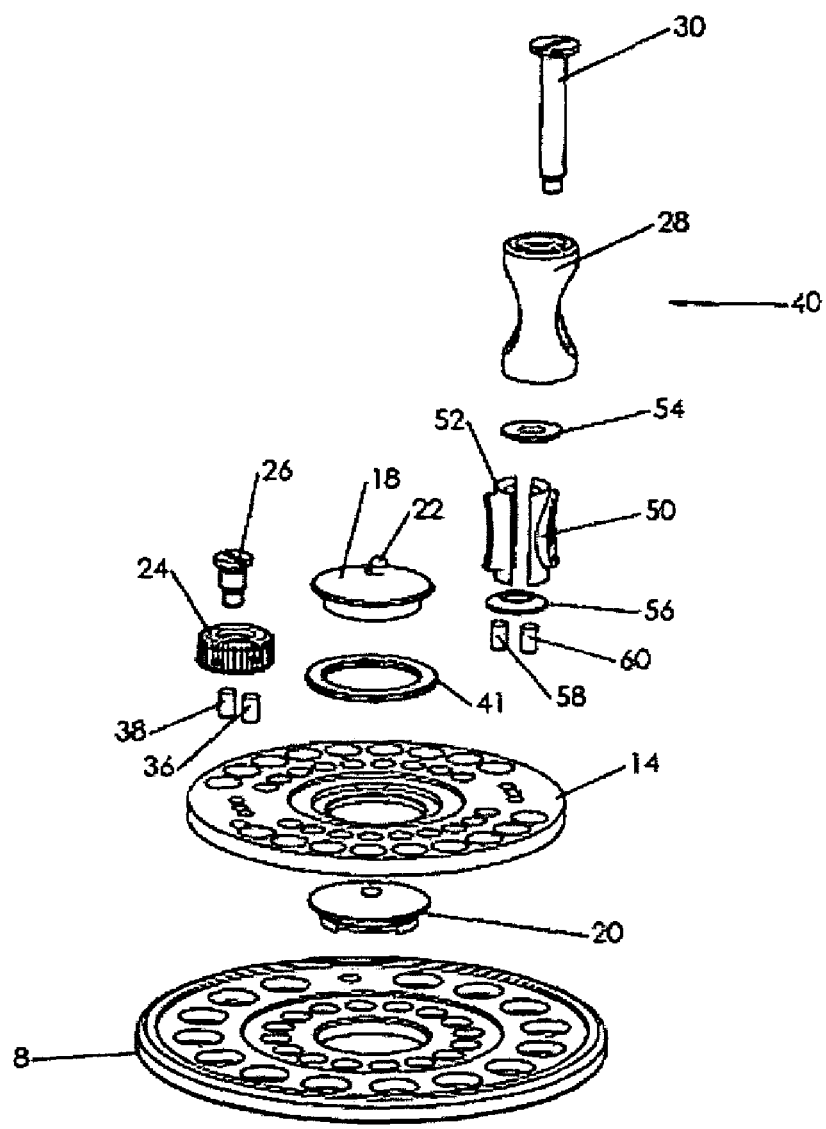
FIG. 3 shows an exploded view of reel parts in accordance with an embodiment of the present invention.

In reference to FIGS. 1, 2, and 3, the reel in accordance with an embodiment of the invention comprises a rotatable line spool 2, the spool comprising a spool flange 4 affixed to one end of a hollow spool shaft 6 which is affixed at its other end to a spool disk 8. In the assembled reel, spool shaft 6 slides onto a main shaft, spindle, or axle 10 which is affixed to cage 12. The spool portion thus far described generally serves for winding up and storing the line and for unwinding and letting out the line, as may be required in typical fishing operations.

Spool 2, together with hollow spool shaft 6 is rotatably mounted coaxially on main shaft 10 for free rotation thereon and proximately to a handle disk 14 coupled to spool disk 8, as will be explained in more detail below. Handle disk 14 is rotatably mounted on main shaft 10 for free rotation relative thereto.

Handle disk 14 includes therein a recessed portion 16 for receiving thereinto a first part of a catch cage 18, which operates by having a flange thereon to retain handle disk 14, and spool 2 on main shaft 10. In one embodiment, a second part of catch cage 18 is fixed by screws to a flange portion at the end of spool shaft 6 distal from its point of attachment to cage 12, the second part of catch cage 18 engaging and cooperating with the first part of catch cage 18 for coupling thereto so as to hold or latch the two parts together by the use of a retaining spring 19 and a mating groove therefor.

A quick-release latch button 22 is provided on catch cage 18 for actuating the retaining spring and thereby releasing the parts of catch cage 18 for separation and thereby allowing handle disk 14 and spool 2 to be slid off main shaft 8. This feature, which is also used on prior art reels, makes it convenient to exchange spools in the field, such as spools having different kinds of fishing line thereon.

A clutch friction adjuster button or knob 24 is mounted on handle disk 14 by way of a screw 26 for setting a friction braking operating force. In the embodiment shown in an "exploded view" in FIG. 3, first and second clutch friction pads 36 and 38 pass through corresponding holes in handle disk 14 and are pressed by clutch friction adjuster button 24 into contact with an annular groove or track in spool disk 8 to provide a friction braking force. The amount of braking force is set by rotating clutch friction adjuster button 24 as needed to force friction pads 36 and 38 against the groove surface in spool disk 8 with greater or lesser force. This braking force, which results in a braking torque, is referred to as the winding-in drag base level.

In accordance with an embodiment of the present invention, handle disk 14 has therein a threaded hole for receiving clutch friction adjustor screw 26, which is a machine screw. Screw 26 may optionally be a shoulder screw with an unthreaded portion. In the present embodiment, screw 26 has two threaded portions and a shoulder portion: one thread is to screw tight into handle disk 14 and the other thread is for adjusting button 24. Screw 26 is always fixed, whereas button 24 is adjustable, depending on how hard the clutch friction is to be adjusted.

Laterally, on either side of this threaded hole are two further holes in handle disk 14, each containing a respective one of cylindrical clutch friction adjustor brake pads 36 and 38. Threaded clutch friction adjuster button 24 is in the form of a threaded ring through which screw 26 passes to hold clutch friction adjustor button 24 in place.

Brake pads 36 and 38 are constrained at their respective first ends by an end surface of clutch friction adjuster button 24 and at their respective second ends by a brake surface which is conveniently optionally integrally formed on spool disk 8. By turning the threaded clutch friction adjuster button 24, the user can adjust the substantially constant friction of the clutch.

By unscrewing the clutch friction adjuster 24, that is, tightening it against the top portion of clutch friction adjuster screw 26, handle disk 14 is enabled to turn freely without rotating the spool disk 8. By completely tightening clutch friction adjuster button 24 against handle disk 14, spool disk 8 and handle disk 14 rotate together, essentially as though they formed one part. This mechanism provides the user with the ability to preset the clutch force according to the tippet being used. If a very small tippet is used, then most likely the clutch friction adjustor button 12 will practically be completely unscrewed, thereby leaving the rotation of the handle disk 6 completely independent of the spool disk.

A handle, comprising a handle cage 28 is affixed to handle disk 14 by way of a handle screw 30 for use by the operator to wind in the line and for providing other functions, as will be explained below in detail.

A brake and anti-reverse mechanism 34 is affixed to cage 12 to provide a desired braking force when a fish on the line runs. This is generally referred to as the standard drag. In accordance with an aspect of the present invention, the standard drag may be set somewhat lighter than would otherwise be the case: this allows a user to take greater advantage of a feature of the present invention wherein the drag force level may be adjusted "on the fly" when a fish is on line, as will be explained in greater detail below. A conventional type of clicking mechanism 32 affixed to cage 12 provides a clicking function when the fish runs. A saddle 5 is affixed to the bottom of the cage or housing.

Referring to features of an embodiment in accordance with the present invention shown in an "exploded" view of parts in FIG. 3, spool disk 8, shown here without other spool parts, is rotatably mounted on main axle or shaft 10 (not shown in FIG. 3) in juxtaposition with handle disk 14 which is also rotatably mounted on the main shaft, with a clutch base 20 therebetween. Handle disk 14 has mounted thereon an operating handle, indicated as 40 whereof details will be explained below. Spool disk 8 and handle disk 14 are retained on the main shaft by the removable catch cage 18 in cooperation with a clutch ring 41.

Clutch element or base 20 has a center hole for accommodating therethrough main shaft 10, a cylindrical portion which fits in the center hole of spool disk 8, and a flange portion which acts as a low friction bearing surface between handle disk 14 and spool disk 8 to maintain a small separation between them, typically 1 millimeter (mm) or so. Clutch ring 41 acts as a low friction bearing between the other side of handle disk 14 and the flange portion of catch cage 18. Catch cage 18, clutch element 41, and clutch base 20 together hold handle disk 14 in proximity to spool disk 8 with the aforesaid small separation therebetween, when latched in the home position. There is a small amount of play between catch cage 9 with the clutch ring 10 and the clutch base 20. This play helps ensure that handle disk 6 can freely rotate without any substantial friction.

The bearing surfaces of clutch ring 41 and clutch base 20 allow handle disk 12 to rotate freely with respect to spool disk 8 and catch cage 18, in the absence of any intentional brake force, as will be explained. Thus, spool disk 8 and catch cage 18 are coupled for rotation together. It will be undersood that clutch base 20 may be coupled to spool disk 8, for example, by screw fasteners as mentioned above or it may be formed integrally therewith. In accordance with an embodiment of the invention, two screws, one of which is shown as screw 11 in FIG. 2, are provided under spool disk 8 that are screwed into catch cage 18, thereby holding parts 14, 20, 8, and 41 together for operation. Functionally, the catch assembly may be thought of or viewed as a part of spool disk 8.

Clutch ring 41 is not needed in an alternative embodiment wherein 3 or more small plastic pins, for example 0.5 mm, are inserted in holes in the surface of handle disk 14 and, by protruding therefrom, bear upon a surface of spool disk 8 so as to maintain the desired separation without much friction. FIG. 4B shows a handle disk 14 in plan and FIGS. 4A and 4C show respective side elevation views, indicating a hole 42 of three holes shown for receiving such plastic pins.

Figures 5A, 5B:
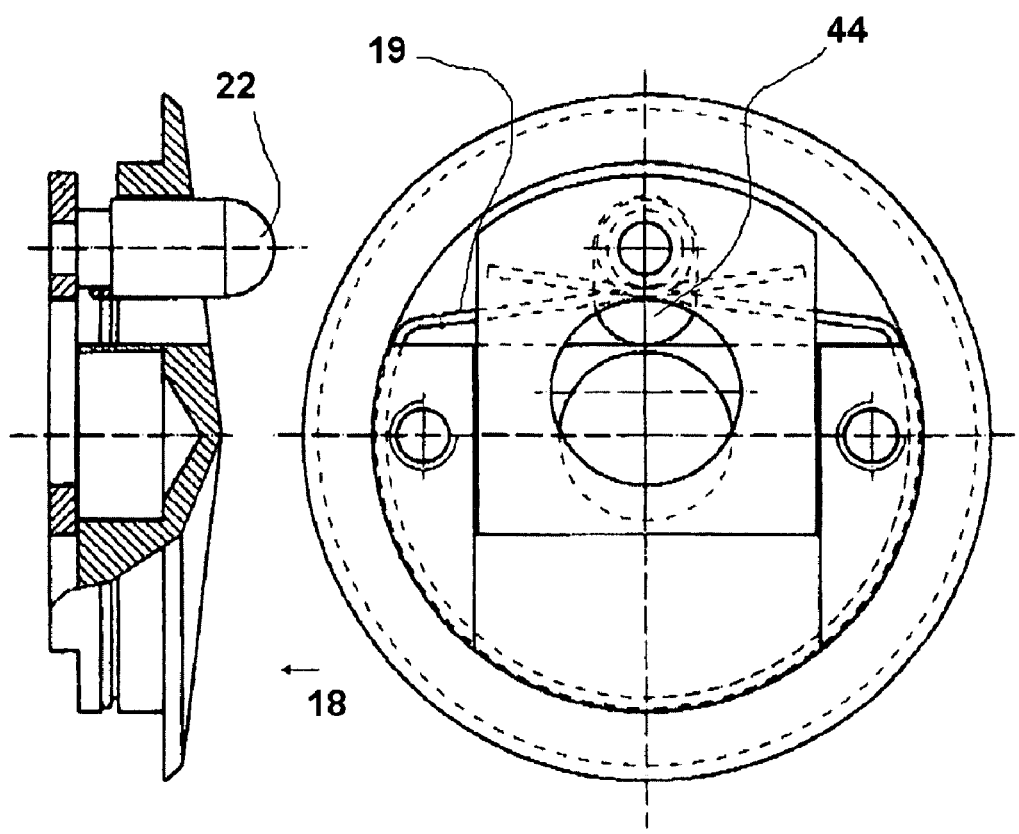
FIG. 5B shows a schematic plan and FIG. 5A shows a side elevation, partly cross-sectioned, of a catch in accordance with an embodiment of the present invention.

FIG. 5B shows an outside view and FIG. 5A shows a partial cross-section view of an embodiment of catch cage 18. As will be apparent, quick release button 22 resides in an elongated hole 44 and may be moved towards the center hole against the force of a spring 46, to effect a disengagement and release of spool 2 from main shaft 10.

Figure 6:
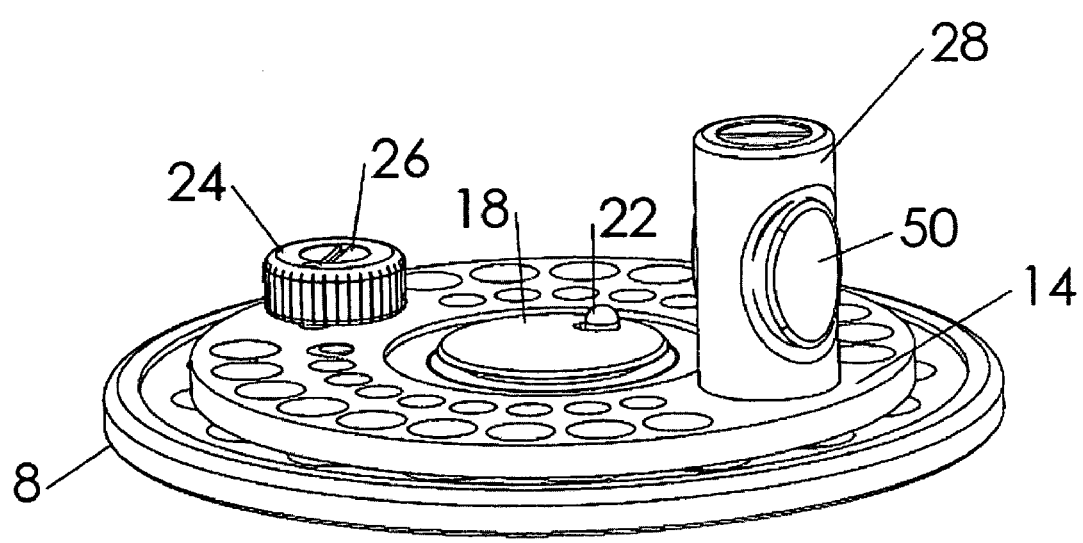
FIGS. 6 and 7 show a view of reel parts in accordance with an embodiment of the present invention.
Figure 7:
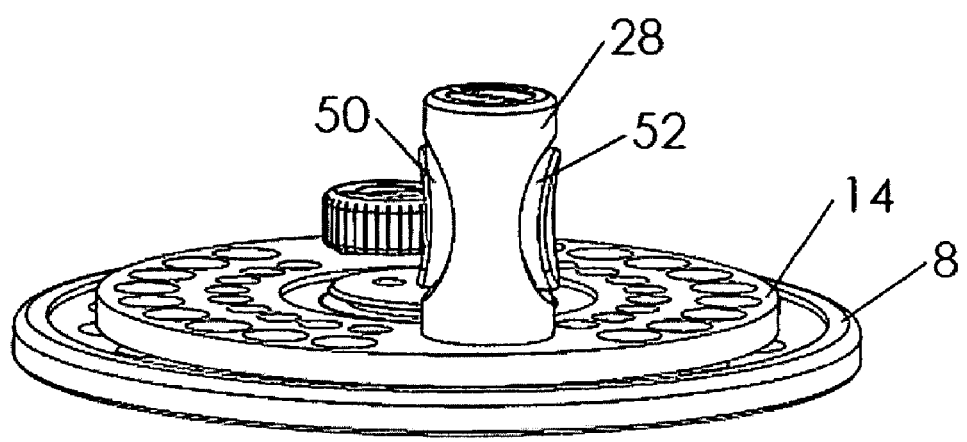

As mentioned above, operating handle 40 is mounted on handle disk 12, as is also shown in FIG. 6 and FIG. 7. Handle 40, being mounted off-center on handle disk 12, provides a crank function for winding in the line by an operator and provides a finger control button function for braking and controlling the line, in accordance with features of the present invention to be described hereinafter.

Figure 8:
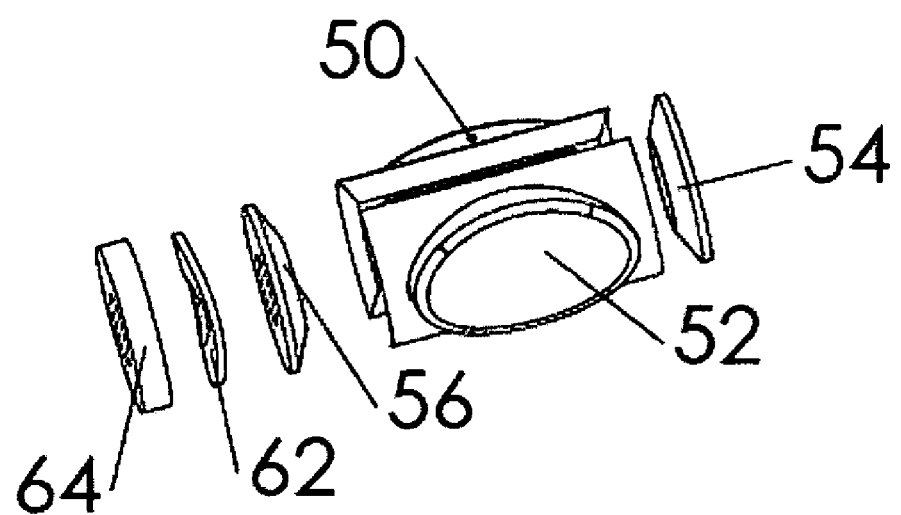
Figure 9:
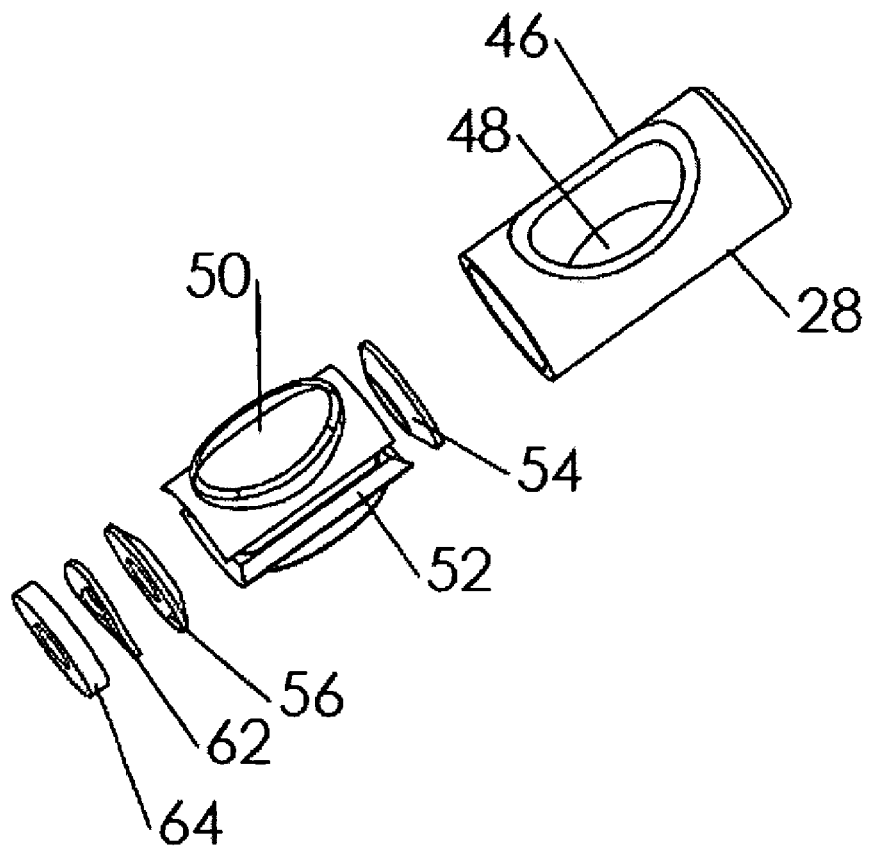
Figure 10:
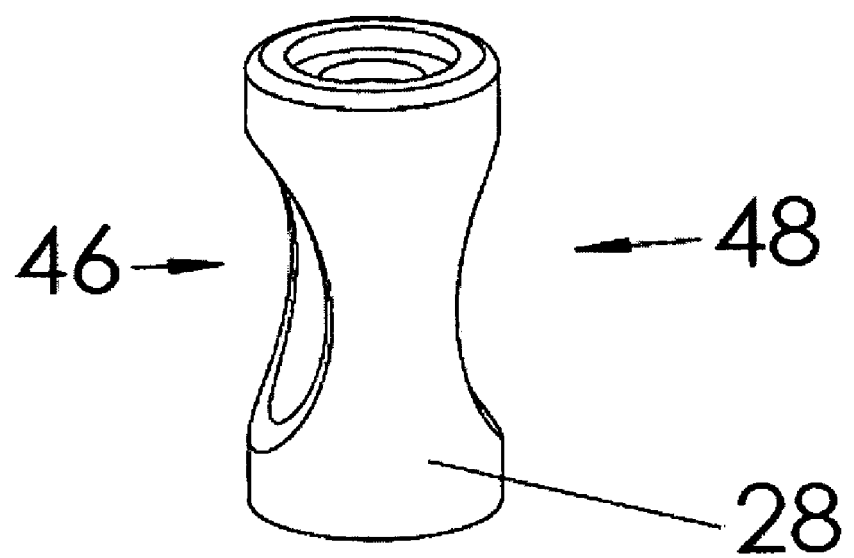
Figure 11:
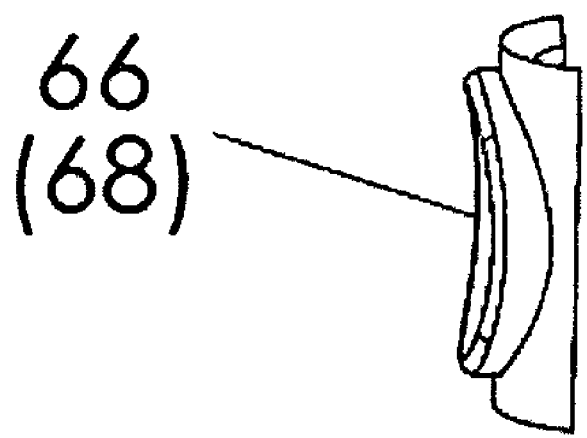
Figure 13:
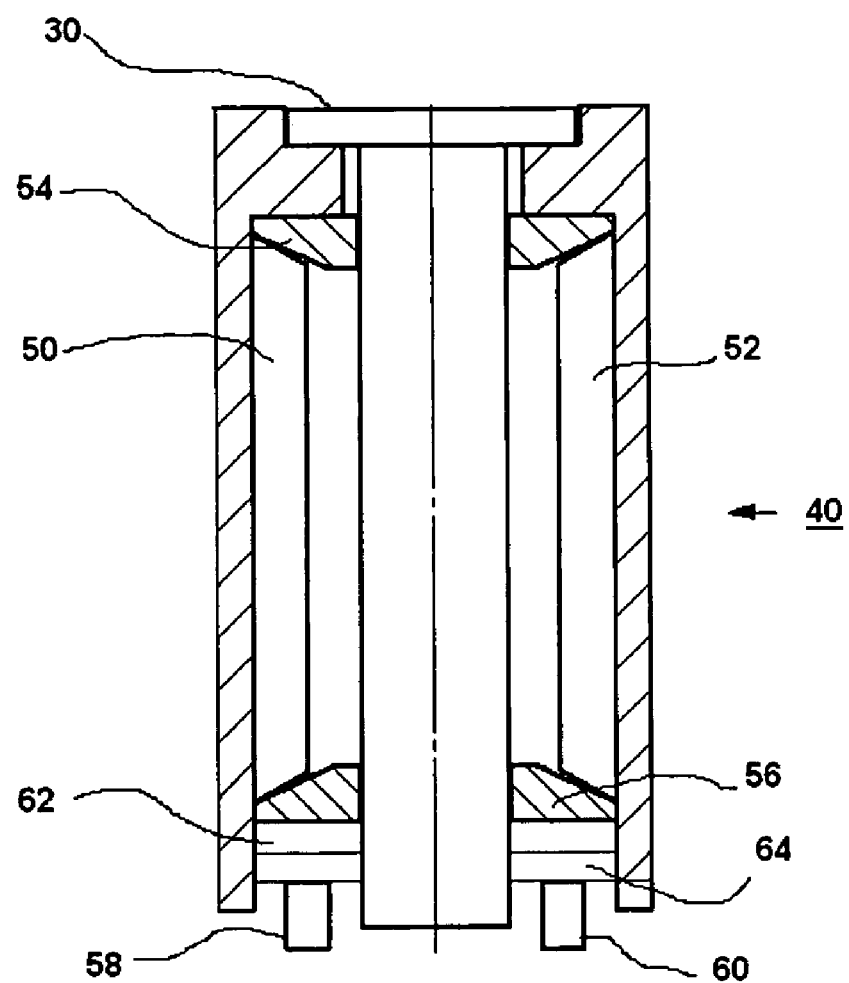
FIG. 13 shows a schematic cross-sectional view of a part of brake actuating mechanism in accordance with an embodiment of the present invention.

Referring more particularly to FIGS. 7, 8, 9, 10, 11, 12, and 13, handle 40 comprises a handle cage 28 which is in the form of a hollow tube 28 having two mutually opposed openings 46 and 48, in its side wall. Handle 40 is affixed to handle disk 14 by means of handle screw 30. FIGS. 8 and 9 show a brake button assembly which comprises first and second brake buttons 50 and 52, mounted within tube 28 and having portions thereof in openings 46 and 48 so as to be accessible to the fingers of an operator who is grasping handle cage 28. A pair of tapered washers 54 and 56 are mounted concentrically on screw 30 and exhibit respective tapered surfaces for cooperative engagement with corresponding respective end surfaces of brake buttons 50 and 52. See also FIGS. 11 and 12. A substantially flat end of tapered washer 56 bears upon a spring washer 62 which, in turn bears upon a flat washer 64. Flat washer 64 bears upon the respective ends of each of two friction pads, 58 and 60, which pass through respective holes in handle disk 14. The respective other ends of friction pads 58 and 60 bear upon a surface of spool disk 8. Similarly, as was previously explained with respect to friction pads 36 and 38, friction pads 58 and 60 bear upon the surface of spool disk 8, preferably in a groove, which may optionally be the same groove as that utilized for friction pads 36 and 38.

Handle 40 includes two brake buttons 50 and 52, which when pressed together form a generally cylindrical hollow tubular shape, exhibiting a combined outside diameter smaller than the inside diameter of handle cage 28. Each of tapered washers 54 and 56 exhibits at least one tapered side surface, the washers being of the approximate shape of the frustrum of a cone. Washers 54 and 56 are arranged to be assembled concentrically axial with the longitudinal center axis of handle 40 and, therefore also approximately coaxial with the longitudinal center axis of brake button 4, one washer on either side of brake button 4, such that the taper surfaces of washers 54 and 56 cooperatively engage respective end surfaces of the brake buttons 50 and 52. The washers and brake buttons 50 and 52 are mutually constrained in this configuration by handle cage 28 in which they are contained. Each of brake buttons 50 and 52 exhibits a respective similar portion or protrusion 66 and 68 respectively, each of which portions may, if desired, protrude into a respective one of the two lateral cut-outs in handle cage 28 to an extent determined to be desirable for the convenience of the user. In any event the cut-outs are of a sufficient size so as to allow free movement in and out of portions 66 and 68. Portions 66 and 68 exhibit a shape and size convenient to a user for selectively exerting finger pressure thereon, such as by the thumb and another finger, for example, in the customary hand position used in cranking the reel while, at the same time, not encumbering the normal activity of cranking or winding the reel. Portions 66 and 68 may be suitably shaped or curved to comfortably and conveniently accommodate finger pressure by a user.

Handle screw 30 passes through the hole in tapered washer 54, thence through the center axial opening in brake button 4 between brake buttons 50 and 52, thence through the hole in tapered washer 56, thence through the holes in washers 64 and 62, and is then screwed into a threaded hole in handle disk 14. Handle cage 28 is constrained at its first end by the head of handle screw 30 and at its second end by handle disk 14, is centered on screw 30 by tapered washers 54 and 56, and remains captive on screw 30 which is arranged to hold its position in its threaded hole in handle disk 14 such that handle cage 28 remains free to turn without binding. The thread at the end of the handle screw (1) is smaller than the rest of the lower diameter giving the screw a shoulder. The screw is therefore tightened until the bigger diameter touches the handle disk 6. As was previously mentioned, laterally, on either side of this threaded hole are two further holes in handle disk 14, each containing a respective cylindrical online brake pad 58 and 60, respectively. Brake pads 58 and 60 are guided in these slightly bigger respective holes on handle disk 14 and are preferably made of a synthetic material suitable for causing a braking force by pressing against a surface of spool disk 8. The brake pads are constrained at their respective first ends by washer 64 and at their respective second ends by a brake surface, such as a groove, integrally formed on spool disk 8. Preferably, this is the same brake surface as that used for wind-in brake pads 36 and 38, and is conveniently formed on the surface of spool disk 8. The length of brake pads 58 and 60 is selected such that with no finger pressure being exerted on portions 66 and 68, the brake pads are not touching the brake surface, or touching it very lightly, and protruding sufficiently from handle disk 14 to urge tapered washer 56 towards tapered washer 54 so as to tend to bring them closer together and thereby to maintain separation of brake buttons 50 and 52 by the action of their respective tapered or conical side surfaces. The necessary tolerances are preferably arranged so that, in the described rest position, brake buttons 50 and 52 are separated to the extent permitted by the surrounding handle cage. In this position, portions 66 and 68 on brake buttons 50 and 52 respectively protrude through or fill to a convenient extent the two lateral cut-outs 46 and 48 in handle cage 28.

The above-described mechanism in accordance with the invention may also be thought of as a brake actuator system utilizing a cam which converts the inward directed finger pressure or force on brake buttons 50 and 52 into a force directed orthogonally to brake pads 58 and 60. The result of the action of the brake pads is to generate a braking torque.

Figure 14A:
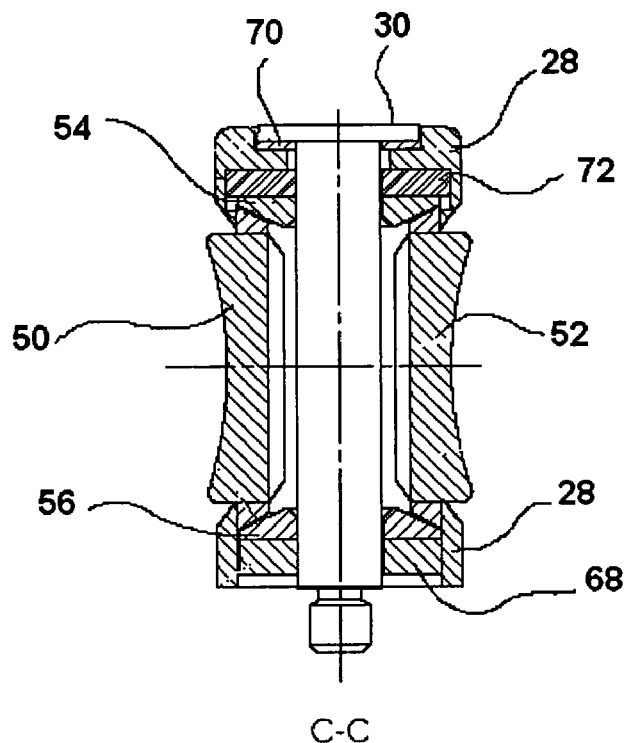
FIGS. 14A and 14B respectively show a schematic cross-sectional side elevation view and a top view of reel parts including a winding handle and a brake actuating mechanism in accordance with embodiments of the present invention.
Figure 14B:
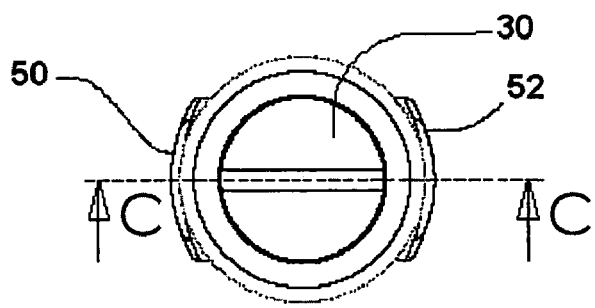

FIG. 14A shows a cross-sectioned elevation and FIG. 14B shows a plan view of an alternate embodiment of the spool handle 40. This differs from the embodiment described above in the following particulars. Spring washer 62 and flat washer 64 are not used; instead, a Teflon™ washer 68 is placed between tapered washer 56 and friction pads 58 and 60. It is also possible to use two juxtaposed thinner washers instead of the single washer 68. A Teflon™ washer 70 is placed under the head of handle screw 30. As Teflon™ has a low coefficient of sliding friction, this tends to reduce friction for rotation of handle 40. A foam rubber washer 72, or a washer of a similar material, is included above tapered washer 54, that is between tapered washer 54 and that portion of handle cage 28 that constrains the upward movement of tapered washer 54 when brake buttons 50 and 52 are squeezed together for braking. The operation of the brake in accordance with the invention is somewhat different with these changes and may be more desirable, as follows.

With the previous embodiment, spring washer 62 provides a cushioning effect so that some discernible movement is required due to compression of spring washer 62 when squeezing friction pads 58 and 60, thereby allowing the user to readily exercise gradual control over the amount of braking. However, it is possible that spring washer 62 may gradually fatigue or lose some of its elasticity or it may become flattened to some extent through use. When this happens, or if the spring constant of spring washer 62 should happen to be too strong, the braking action in accordance with the invention may tend to require only a small range of motion of brake buttons 50 and 52 when squeezing from the no braking position to strong braking. The inclusion of foam rubber washer 72 in the present alternate embodiment typically allows a greater range of movement of brake buttons 50 and 52 when squeezing from the no braking position to strong braking, thereby making it easier to exercise a finer degree of control over the braking action in accordance with the principles of the present invention.

In operation, handle cage 28 is utilized as a crank handle for winding the reel. When it is desired to apply an increased winding torque to spool disk 8 or a braking force, as when the reel is unwinding, brake buttons 50 and 52 are squeezed together by the operator, who still has full control of winding or holding stationary the crank handle as may be desired. Squeezing brake buttons 50 and 52 together urges them together causing them, in turn, to act on the tapered washers 54 and 56, tending to urge them to greater mutual separation. Tapered washer 54 is ultimately constrained by the head of handle screw 30 and cannot move in that direction. Tapered washer 56 is urged against brake pads 58 and 60 which, in turn, are urged into more forceful contact with the brake surface on spool disk 8 and thereby cause a frictional coupling or braking action of spool disk 8 relative to handle disk 14. It is noted that the braking action is available while winding the reel using handle cage 28 as a crank, so that the brake is acting as a coupling clutch for winding and braking is available when the reel is unwinding and handle cage 28 is being held stationary.

Briefly, in operation, spool handle 40, mounted on handle disk 14 is utilized as a crank pin or crank handle to permit manual winding of the spool by cranking. Handle cage 28 is, in effect, a part of the handle, where the openings or cut-outs 48 and 46 allow the fingers of a user grasping handle 40 to exert pressure selectively by a squeezing action on brake buttons 58 and 60, of which at least a portion is an internal part in handle cage 24, as will be explained in more detail below. This causes a braking action on the spool which is under control of the user or operator.

The clutch allows spool disk 8 to rotate freely, including in the opposite direction to the rotation of handle disk 14. Clutch ring 41 is preferably made of synthetic material reducing the friction that could be created between the two disks 14 and 8. The length of brake pads 36 and 38 is selected such that with a convenient tightening of wind-in screw 11, brake pads 36 and 38 are touching the brake surface with a certain pressure for providing a frictional coupling or braking force between handle disk 14 and spool disk 8. The braking force is adjustable by adjusting winding-in adjuster button 24 for adjusting the winding-in drag to a desired value, for example, as being suitable for the tippet being fished. As mentioned above, the standard drag is adjustable by the user in a known manner by adjusting or setting brake system 34 on the other side of the reel to handle disk 14.

A user may thus adjust the winding in drag and the standard drag to convenient values for the particular situation in which the rod is being used. Because of the convenient control possible with the present invention, the standard drag may be set to a lower value than would otherwise be typically used. By simply squeezing the handle, the user also squeezes the brake button and thereby conveniently and readily adjusts the drag to a value greater than the standard drag, which sets a minimum value when no pressure is applied to the handle.

If a fish is hooked and then starts to run, the crank handle can remain in the fisherman user's fingers without any risk of breaking the tippet. It is now the user's decision to wait until the fish stops running or the user can start activating the online brake simply by pressing the two brake buttons together. If the brake buttons are squeezed together with a strong force, then the spool disk 8 which is turning comes to a complete stop as the reel handle is held stationary by the user. There is also the option of squeezing the brake buttons together and cranking the handle, thereby forcing the fish towards the user. All of these above abilities give the user a variety of possibilities during the fight with the fish which were not possible in this convenient manner in the past. Because the reel handle need not turn while line is being taken out, the user may keep hold of the handle and retain control of the drag at all times. No "palming" or reaching around to adjust knobs is required in use to change or adjust drag—the user can keep a hand on the handle and adjust the drag by squeezing it.

It is significant to note that, in accordance with the present invention, the desired amount of drag is adjustable by the user while a fish is on the line. This is in contrast with prior art reels where the drag must generally be preset before hooking a fish. Squeezing the handle to increase drag corresponds well with an instinctive "tightening" action in the sense of gripping to increase drag. Furthermore, because the control is virtually instantaneous, the fisherman is able to adjust the drag in response to rapid changes in tactics for handling the requirements of situations typically arising in fishing such as when a fish makes a long run whereby the tippet is in danger of breaking and a lighter drag force is required.

The following actions are thus made possible:

If clutch friction adjuster button 24 is completely unscrewed and buttons 50 and 52 not squeezed together, then spool disk 8 does not rotate with handle disk 14 and indeed, is free to turn in the opposite direction if a fish is pulling the line.

If clutch friction adjuster button 24 is completely tightened then disk 8 always turns in unison with disk 14.

If clutch friction adjuster button 24 is set to give a light frictional force to disk 8 and buttons 50 and 52 are not squeezed and no fish is on the line, then the disk 8 rotates in the same direction as handle disk 14, thereby winding in the line.

If clutch friction adjuster button 24 is set to give a light frictional force to disk 8 and buttons 50 and 52 are not squeezed and a fish is on the line and running, then disk 8 rotates in the opposite direction.

If clutch friction adjuster button 24 is set to give a light frictional force to disk 8 and buttons 50 and 52 are squeezed together and a fish is on the line, then disk 8 rotates in the same direction as handle disk 14, thereby forcing the fish towards the fisherman.

While the invention has been described by way of exemplary embodiments, it will be understood by one of skill in the art to which it pertains that various changes and substitutions may be made to the describe embodiments. For example, the described embodiments utilize two tapered washers; it is possible to arrange the button mechanism so as to use only one tapered washer, with a passive support at the other end. It is likewise not essentially that two brake pads be used: the mechanism is adaptable to using a single brake pad, although two are herein considered preferable. Such changes, substitutions and the like may be made without departing from the spirit and teaching of the invention which is defined by the claims following.

What is claimed is:

1. A fishing reel comprising:
a spool, including a spool disk;
a handle disk mounted coaxially and rotatably with respect to said spool disk and in juxtaposition thereto;
a winding handle affixed off-center to said handle disk; and
a brake mechanism, including an actuator incorporated in said handle, for applying a braking torque between said spool disk and said handle disk, said braking torque being controllable by a user by squeezing said handle while holding said handle for cranking.

2. A fishing reel comprising:
a spool for winding a fishing line;
a handle disk mounted coaxially and rotatably with respect to said spool and in juxtaposition thereto, and having a winding handle mounted off-center thereon;
a brake for applying a drag braking force between said spool and said handle disk;
said winding handle comprising a brake button system incorporated in said winding handle and being coupled to said brake for applying said brake responsive to finger squeezing pressure being applied to said winding handle and in accordance with said finger squeezing pressure.

3. A fishing reel as recited in claim 2, wherein said brake button system comprises;
at least a first brake button;
a cam apparatus coupled to said first brake button and further coupled to said brake.

4. A fishing reel as recited in claim 3, wherein:
said brake comprises a brake pad for bearing against a surface portion of said spool for applying a friction braking force thereto; and
said cam apparatus comprises a conical or tapered washer coupled between said brake button and said brake pad such that finger pressure applied to said brake button causes said washer to exert a force against said pad so as to increase said friction braking force.

5. A fishing reel as recited in claim 3, wherein:
said brake button system comprises first and second brake buttons;
said brake comprises first and second brake pads for bearing against said surface portion of said spool for applying a friction braking force thereto; and
said cam apparatus comprises a conical or tapered washer coupled between (a) said first and second brake buttons and (b) said first and second brake pads, such that finger pressure applied to said first and second brake buttons tending to squeeze them together causes said conical washer to exert a force against said pads so as to increase said friction braking force.

6. A fishing reel comprising:
a spool for winding a fishing line, including a spool disk;
a handle disk mounted coaxially and rotatably with respect to said spool disk and in juxtaposition thereto, and having a winding handle mounted off-center thereon;
a brake for applying a drag braking force between said spool and said handle disk said brake being responsive to a brake actuation force; and
said winding handle comprising a pressure sensitive brake actuating mechanism incorporated in said winding handle and being responsive to finger squeezing pressure on said winding handle for applying said brake actuation force for actuating said brake.

7. A fishing reel as recited in claim 6 wherein said winding handle comprises a button mechanism and at least one captive brake pad arranged such that, when a user squeezes said winding handle, said button mechanism acts to cause application of said brake by urging said at least one brake pad into contact with said spool disk, thereby generating a frictional torque between said spool disk and said handle disk.

8. A fishing reel as recited in claim 7 wherein said button mechanism operates by utilizing an inclined surface to produce a force on said at least one captive brake pad.

9. A fishing reel as recited in claim 7 wherein said button comprises two halves of a hollow cylindrical body arranged such that when said two halves are pressed together by a user, a respective tapered washer at each end of said two halves operates as an inclined plane to tend to slide out axially and exert a force against a constraint on one side, and to exert a force against said at least one captive brake pad, respectively.

10. A fishing reel as recited in claim 7 wherein said button comprises two halves of a hollow cylindrical body arranged such that when said two halves are pressed together by a user, a respective tapered washer at each end of said two halves operates on an "inclined plane principle" to tend to slide out axially and exert a force against a constraint of said winding handle on one side, and to exert a force against said at least one captive brake pad on the other side, respectively.

11. A fishing reel comprising:
a spool for winding a fishing line;
a handle disk having a winding handle thereon;
a brake for applying a drag braking force between said spool and said handle disk;
said winding handle including an actuating mechanism for said brake, said mechanism being adapted to respond to finger pressure of a user's fingers squeezing said winding handle while holding said winding handle normally for winding said reel so as to apply said brake as a function of said finger pressure so that said user's fingers do not have to leave said winding handle to operate said brake.

12. A fishing reel comprising:
a spool, including a spool disk;
a handle disk mounted concentrically juxtaposed to said spool disk;
a brake mounted on said handle disk for applying a braking force between said spool disk and said handle disk;
a dual purpose reel handle mounted on said spool disk, said reel handle comprising a finger grip portion adapted for being grasped by a user's fingers for winding said reel; and
said reel handle comprising a brake actuator coupled between said finger grip portion and said brake, such that squeezing said finger grip portion by said user's fingers causes said actuator to apply said brake in accordance with said pressure.

13. A fishing reel comprising:
a spool adapted for rotatably mounting on an axle and coupled to a spool disk for rotation therewith;
a handle disk rotatably mounted concentrically with and in juxtaposition to said spool disk;
a drag brake pad arrangement mounted on said handle disk and bearing against said spool disk with a controllable braking force for providing braking between said spool disk and said handle disk;
a handle, comprising a generally cylindrical hollow handle housing rotatably mounted on said handle, said handle housing exhibiting an opening in a cylindrical wall thereof; and
a brake actuating mechanism disposed in said handle housing and being coupled to said drag brake pad arrangement for controlling said braking force, said mechanism comprising a brake button accessible to a user's fingers through said opening while gripping said handle for cranking said handle disk.

14. A fishing reel in accordance with claim 13, wherein said mechanism comprises:
a cam element, exhibiting an inclined surface and an end surface, said cam element being disposed in said housing such that pressing said brake button causes said brake button to press against said inclined surface thereby causing said end surface to push against said drag brake pad.

15. A fishing reel comprising:
a housing, including an axle;
a spool, including a spool disk, rotatably mounted on said axle;
a handle disk rotatably mounted concentrically with and in juxtaposition to said spool disk;
first and second drag brake pads mounted on said handle disk and bearing against said spool disk with a controllable braking force for providing braking between said spool disk and said handle disk;
a generally cylindrical hollow handle housing rotatably mounted on said handle disk and adapted for gripping by a user's fingers for cranking said handle disk, said handle housing exhibiting first and second diametrically opposed openings in a cylindrical wall thereof; and
a brake actuating mechanism disposed in said handle housing and being coupled to said drag brake pads for controlling said braking force, said mechanism comprising first and second brake buttons accessible through said first and second openings, respectively, to a user's fingers while gripping said handle for cranking said handle disk.

16. A fishing reel in accordance with claim 15, wherein:
said brake actuating mechanism comprises first and second brake buttons accessible for being squeezed together through said first and second openings, respectively, by said user's fingers; and
a cam element, exhibiting an inclined surface and an end surface, disposed in said housing such that squeezing together said first and second brake button causes said brake buttons to press against said inclined surface thereby causing said end surface to push against said drag brake pads.

17. A fishing reel in accordance with claim 16, wherein:
said brake actuating mechanism comprises first and second brake buttons accessible for being squeezed together through said first and second openings, respectively, by said user's fingers; and
a tapered washer having a an inclined surface and a flat surface disposed in said housing between said brake buttons and said drag brake pads such that squeezing together said first and second brake button causes said brake buttons to press against said inclined surface thereby urging said flat surface to move in a direction towards said drag brake pads; and
a resilient or elastic element interposed between said flat surface and said drag brake pads such that gradually squeezing together said first and second brake button causes said brake buttons to apply a progressively increasing braking force.

18. A fishing reel in accordance with claim 17, including:
a further tapered washer having an inclined surface and a flat surface disposed in said housing such that squeezing together said first and second brake button causes said brake buttons to press against said inclined surface of said further tapered washer thereby urging said flat surface to move in a direction away from said drag brake pads; and
an axle passing through bearings in said generally cylindrical hollow handle housing, said axle having one end thereof affixed to said handle disk and the other end thereof forming an endstop for said handle housing and thereby preventing movement of said flat surface of said further tapered washer.

19. A fishing reel in accordance with claim 18, including:
a resilient or elastic element interposed between said flat surface of said further tapered washer and said endstop.

20. A fishing reel in accordance with claim 19, including:
an adjustable brake mounted on said handle disk for providing a base level drag between said spool disk and said handle disk.

21. A fishing reel in accordance with claim 20, including:
an adjustable brake mounted on said housing for providing a standard drag level drag between said spool disk and said handle disk.

22. A fishing reel comprising:
a reel housing;
a main axle affixed to a wall of said reel housing;
a spool having a flange and having a hollow shaft rotatably mounted concentrically on said main axle;
a spool disk rotatably mounted concentrically on said main axle and coupled to said hollow shaft for rotation therewith;
a handle disk having thereon a handle, said handle comprising a handle housing or cage;
a catch unit affixed to said spool disk, said catch unit having a latching mechanism to maintain a home position on said main axle and having a bearing portion for retaining said handle disk in coaxial and freely rotatable relationship to said spool disk;
a brake system mounted on said handle reel for providing a controllable drag braking force acting between said spool disk and said handle disk for resisting relative motion between the two to the extent of the braking force provided by said brake system comprising first and second friction pads located in respective holes in said handle disk and bearing upon a surface of said spool disk; and
a brake control system being situated in said handle and comprising:
an axle screw passing through bearings in said handle housing and being affixed to said handle disk, said screw exhibiting a screw head for acting as a stop against said housing moving away from said handle disk;
first and second brake buttons arranged on opposite sides of said axle screw and being accessible for user finger pressure through respective diametrically opposed first and second openings in said handle housing,
first and second conical washers slidably mounted concentrically on said axle screw and so oriented that squeezing said brake buttons together causes said brake buttons to press against said conical washers in "inclined plane fashion" and so tending to urge greater separation between said washers, wherein movement of said second conical washer is constrained by said handle housing, and
a spacer arrangement interposed between (a) said first conical washer and (b) said first and second friction pads for transferring force between said first conical washer and said friction pads.

23. A fishing reel as recited in claim 22 wherein said spacer comprises a resilient foam washer such that gradually squeezing together said first and second brake button causes said brake buttons to apply a gradually increasing braking force.

24. A fishing reel as recited in claim 23 wherein said brake pads are made of a synthetic material.

25. A fishing reel as recited in claim 24 wherein said brake pads bear upon a groove formed in said surface of said spool disk.

26. A fishing reel in accordance with claim 22, including:
an adjustable brake mounted on said handle disk for providing a base level drag between said spool disk and said handle disk.

27. A fishing reel in accordance with claim 26, including:
an adjustable brake mounted on said housing for providing a standard drag level drag between said spool disk and said handle disk.

28. A fishing reel comprising:
a spool disk;
a handle disk mounted coaxially and rotatable with respect to said spool disk and in juxtaposition thereto;
a winding handle mounted off-center on said handle disk; and
means incorporated in said winding handle for controlling a braking force between said spool disk and said handle disk, comprising:
means for providing said braking force responsive to a brake actuation force;
means for deriving said brake actuation force from finger squeezing pressure applied to said winding handle; and
means for applying said brake actuation force to said means for providing a braking force.

29. A fishing reel comprising:
a handle disk having a crank handle for cranking said reel mounted off-center thereon;
a brake between said reel and said handle disk for providing a drag force for said reel; and
a pressure-responsive brake actuating mechanism incorporated in said crank handle and coupled to said brake, said mechanism being responsive to said crank handle being squeezed with a given pressure for controlling said brake so as to control said drag force to a value determined by said given pressure.

30. A method for controlling a braking force for a fishing reel spool comprising:
providing a brake between said spool and a handle disk;
providing a winding handle mounted off-center on said handle disk;
providing a pressure-responsive brake actuating mechanism incorporated in said winding handle;
applying finger squeezing pressure to said winding handle for deriving a brake actuation force from said pressure-responsive brake actuating mechanism; and
applying said brake actuation force to said brake for causing said brake to operate.

* * * * *